June 2, 1970 — H. A. STAMMEN — 3,515,233
ARTICULATED INDUSTRIAL TRUCK
Filed May 8, 1968
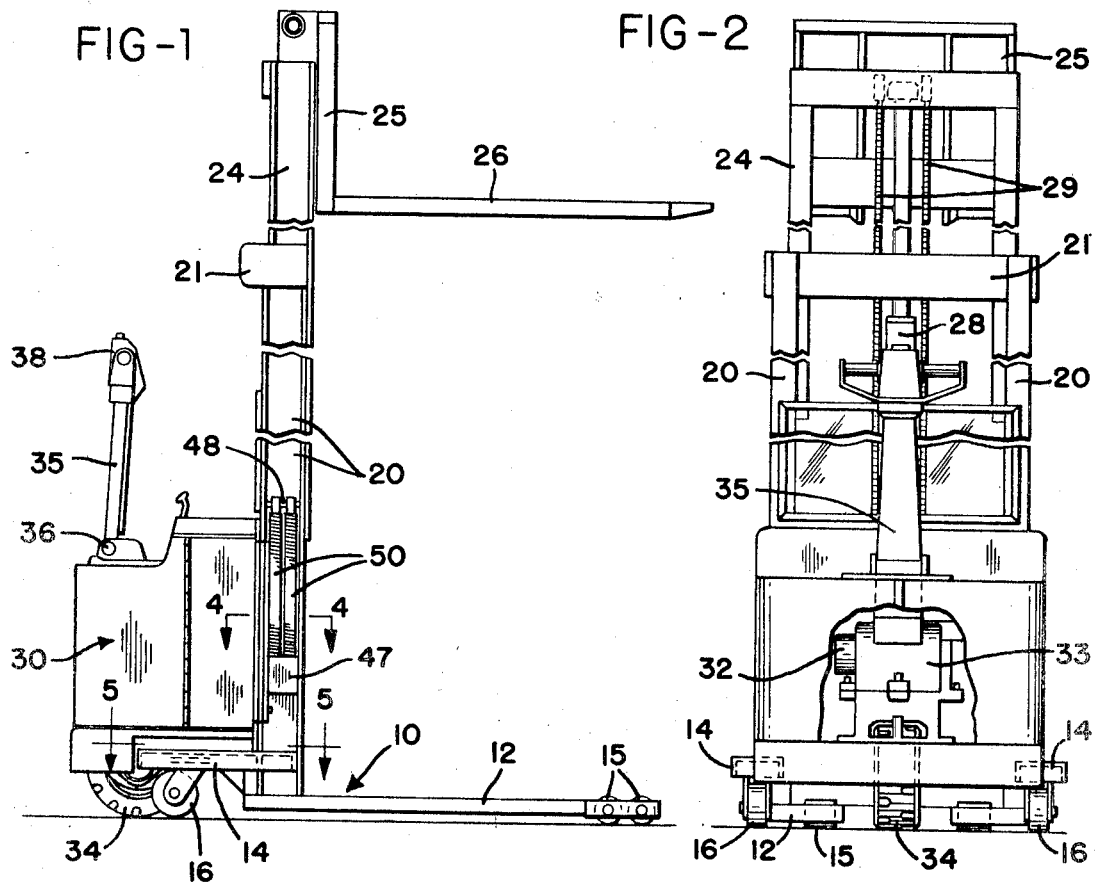
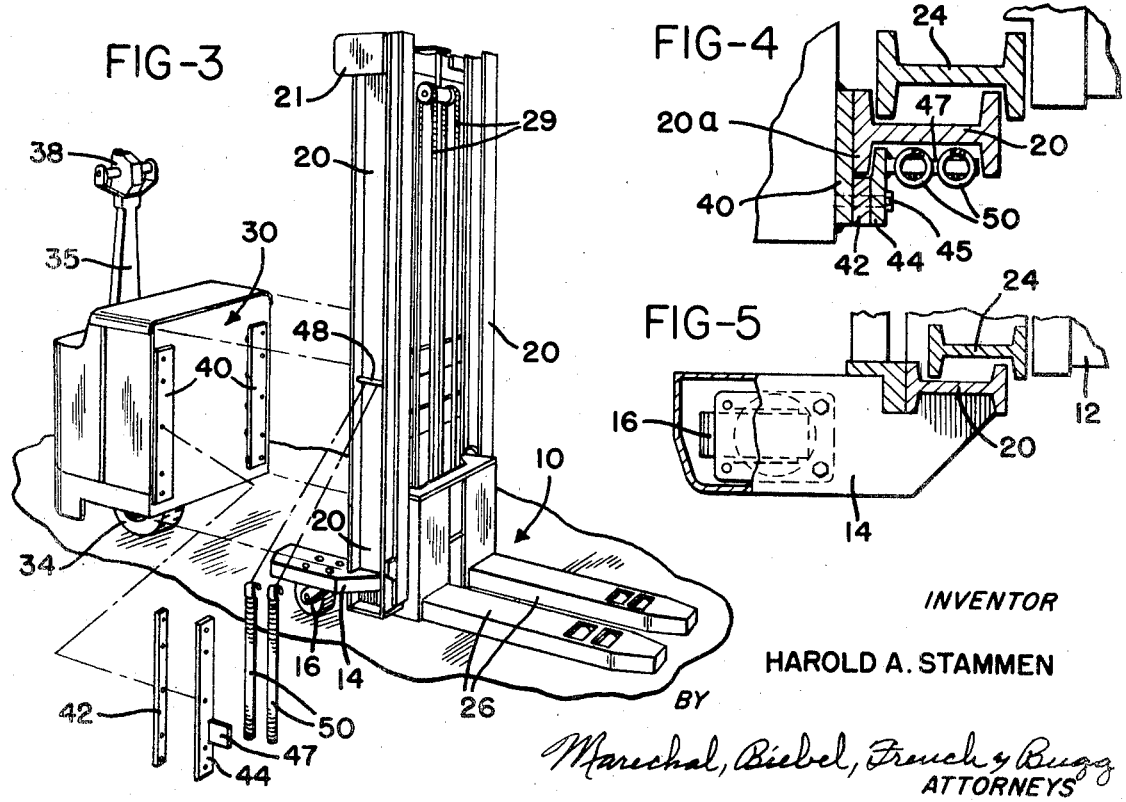
INVENTOR
HAROLD A. STAMMEN
BY
Marechal, Biebel, French & Bugg
ATTORNEYS

United States Patent Office 3,515,233
Patented June 2, 1970

3,515,233
ARTICULATED INDUSTRIAL TRUCK
Harold A. Stammen, New Bremen, Ohio, assignor to Crown Controls Corporation, New Bremen, Ohio, a corporation of Ohio
Filed May 8, 1968, Ser. No. 727,450
Int. Cl. B60d 7/00
U.S. Cl. 180—13                      6 Claims

ABSTRACT OF THE DISCLOSURE

An industrial truck with a wheel supported frame, includes a vertical mast consisting of spaced vertical beams for mounting a lift mechanism. A traction unit consisting of a traction wheel, control and power components and steering mechanism, is connected to the frame in a manner to accomplish a vertical sliding movement with respect to the frame through flanges, engaging the beams. Springs connected between the frame and traction unit transfer a part of the weight of the traction unit to the frame.

BACKGROUND OF THE INVENTION

This invention relates to an improvement in industrial trucks, particularly self-propelled lift trucks or the like. A typical lift truck has a supporting frame with ground engaging wheels and a mast structure extending vertically from the frame. This mast structure provides a mounting and support for lift mechanism. The frame is supported on wheels, two such wheels being mounted at the ends of outriggers which extend rearwardly and form a part of the frame. Sometimes front wheels, usually casters, are mounted somewhat forwardly at the base of the mast. These wheels support the main frame of the truck and any load which it carries.

For traction and steering, there is attached to the frame a steerable traction wheel which is driven by a suitable means of propulsion. Typically an electrical motor drives this traction wheel and power for the motor is provided by an electrical storage battery carried on the truck. When the motor, traction wheel, and speed reducer are articulated to the frame, this sub-assembly is typically called a "drive unit." In referring to a sub-assembly including also the contractor or equivalent control, power source such as batteries, and possibly a pump and its motor, valving, etc., the term "power unit" is often used. For purposes of this description, a generic term "traction unit" is used to identify either a drive unit or a power unit, since the invention is applicable to both. The operator walks adjacent to the truck, usually in front of it, and controls the speed and direction of the traction wheel through the tiller bar.

It is desirable to provide some form of mounting for the traction unit which permits it to move vertically with respect to the frame of the truck, to assure proper traction and steering when moving over uneven surfaces. For instance traction units have been mounted on flexible leaf springs extending from the frame, thus transferring weight from the frame to the traction unit, and connected through linkages or roller and guide arrangements to the frame.

SUMMARY OF THE INVENTION

The present invention provides an improved and simplified connection between the traction unit and the main frame of that type of industrial truck, which is sometimes known as an articulated truck. Generally the mast is formed of spaced vertical beams, usually I-beams, and in accordance with the invention connecting and guiding flanges are provided on the traction unit of the truck to embrace a substantial segment of the mast beams, such as to be vertically slidable on the front of the mast structure but secured against tilting in either a sideways or fore and aft direction. This connection thus makes use of the flanges of the mast beams as part of the guiding and mounting structure for the vertically movable traction unit, and greatly simplifies the construction and maintenance of the entire articulated truck. Preferably, one or more coil springs are connected between a point on the mast beam and the flanges on the traction unit, thus transferring a part of the weight of the traction unit to the mast, and through it to the frame of the truck.

Accordingly, the primary object of the invention is to provide an industrial truck with a traction unit that is vertically slidably mounted by connected flanges on the truck overlapping the spaced apart beams of the truck mast; and to provide an arrangement whereby a portion of the weight of the traction unit is transferred to the mast and frame.

Other objects and advantages of the invention will be apparent from the following description, the accompanying drawing and the appended claims.

In the drawing:

FIG. 1 is a side elevational view of a typical industrial truck incorporating the invention, with portions of the mast and lift structure broken away to shorten the illustration;

FIG. 2 is a front elevational view of the truck shown in FIG. 1, with a section of the traction unit housing broken away to show the traction motor and the tiller connection to the traction wheel;

FIG. 3 is an exploded perspective view showing the frame and mast of the truck separated from the traction unit, and with the connecting flanges separated from each, together with the weight transferring springs;

FIG. 4 is an enlarged partial sectional view through the mast structure, taken generally on line 4—4 in FIG. 1; and FIG. 5 is a cross-sectional view taken generally along the line 5—5 in FIG. 1, with a part of the frame broken away to illustrate the front caster wheels.

DESCRIPTION OF THE PREFERRED EMBODIMENT

Referring to the drawing, and particularly to FIGS. 1, 2 and 3, the improved industrial truck provided by the invention comprises a frame or base indicated by the general reference numeral 10. Since the type of truck shown is a self-propelled unit where the operator walks and guides it, the nomenclature used hereafter follows the standard procedure where the front of the truck is considered to be at the location of the tiller bar. The frame thus includes rearwardly extending outriggers 12 and forwardly extending arms 14. Ground engaging wheels 15 are mounted near the ends of the outriggers, and swiveling caster units 16 are mounted in each of the arms 14.

Extending vertically upward from the frame 10 is a mast structure including spaced parallel outer mast beams 20 which are fixed to the frame 10 at their lower ends and which are joined at their upper ends by a crosspiece 21. Lift mechanism is supported by the mast. Details of this lift mechanism are not shown since it can take various forms. As a typical example, an inner mast structure 24 is mounted in telescopic arrangement between the mast beams 20, and lift carriage 25, having rearwardly extending forks 26, is mounted for vertical movement within the inner mast 24. Suitable lift mechanism is incorporated for raising and lowering the carriage 25, and in the case of the telescopic mast structure shown, for also raising and lowering the inner mast structure 24. Details of this lift mechanism are conventional. It is noted that this mechanism may include a hydraulic cylinder 28 (FIG. 2) and connecting chains 29.

The load supported by the forks 26 is transferred through the mast structure to the frame 10, and the casters and wheels in turn support the entire frame and its load on the ground. Forward of the mast beams 20 there is a traction unit comprising a housing or body 30 within which is contained an electric drive motor 32 and suitable reduction drive mechanism 33 connected to the traction and steering wheel 34. Preferably the entire unit comprising the wheel 34 and the associated motor and speed reduction mechanism is mounted to rotate about a vertical axis, and this rotation is controlled by a tiller bar 35. This bar is coupled to these parts through a pivot pin 36 such that the tiller bar may be lowered from the vertical position shown. The handle 38 at the outer end of the tiller bar incorporates suitable switching and control apparatus (not shown in detail) through which the operator may control the direction and speed of the motor 32 as he steers the truck with the tiller bar. In some cases controls for the lift mechanism may also be incorporated in the handle 38.

The traction unit housing 30 preferably also includes mountings for receiving one or more electrical storage batteries (not shown), and switching apparatus such as contactors or equivalent, which provide the power for and to the motor 32. In the embodiment shown, the batteries are included in the traction unit housing, since their weight helps to hold the traction wheel 34 in contact with the ground.

At the rear of the traction unit 30 there are connecting flanges which form a vertical slidable connection between the traction unit and the forward outside flanges 20a of the mast beams 20. Details of this arrangement are shown particularly in FIGS. 3 and 4. In a suitable form these flanges include plates 40 welded or otherwise secured to the rear wall of the traction unit. Bolted to the plates 40 are spaced strips or bars 42 and wider flange bars 44. Suitable connecting bolts 45 extend through these bars and into the plates 40 in the assembled position such as shown in FIG. 4. In FIG. 3 these parts are separated in the exploded view to show the relationship of the various parts.

Thus, the bars 44 and 42 when bolted in position extend around the mast beam flanges 20a and prevent sideways or fore and aft movement of the drive unit with respect to the main frame and mast, while accommodating vertical sliding movement as may be necessary during operation of the truck. For example, since the wheels and casters provide a four-point suspension arrangement, when the truck is moved over uneven floors, or up and down ramps, if the drive unit including the traction wheel 34 were fixed rigidly to the frame of the truck, it might be held out of contact with the floor under some circumstances. The vertical sliding movement together with the weight of the traction unit 30, assures contact of the traction wheel 34 with the ground or floor, both for driving and steering purposes.

It has been found desirable, to provide that some of the weight of the traction unit, that amount not required for traction, be transferred to the main frame and lift structure, thus improving the stability of the truck. For this purpose rearwardly extending arms 47 are fastened to the flange bars 44 and extend generally into the space between the flanges of the mast beams 20, particularly as shown in FIG. 4. At a point above the normal location of the arms 47, crosspins 48 are secured between the flanges of the mast beams 20, spaced outward from the web or main body of the beams. The pins 48 and arms 47 provide anchorage points for the opposite ends of the coil springs 50 which are connected between them. These springs thus function as a weight transferring mechanism whereby part of the weight of the traction unit 30 is supported through the springs between the mast beams.

While the form of apparatus herein described constitutes a preferred embodiment of the invention, it is to be understood that the invention is not limited to this precise form of apparatus, and that changes may be made therein without departing from the scope of the invention.

What is claimed is:

1. In an industrial vehicle having a frame, a mast having oppositely disposed flanges and extending upwardly from said frame for supporting lift mechanism, laterally and longitudinally spaced wheels on said frame for supporting said frame and a load carried by the lift mechanism, a traction unit including a body independent of said frame and at least one drive wheel, and flange members on said body embracing a substantial segment of said mast flanges forming a vertical sliding connection for said traction unit to the vehicle and preventing relative motion between said traction unit and the vehicle in other directions.

2. An industrial vehicle as defined in claim 1, including means connected between said traction unit and said frame to transfer a portion of the weight of said traction unit to said frame.

3. An industrial vehicle as defined in claim 2, wherein said weight transferring means includes spring means connected between said mast and said traction unit.

4. An industrial vehicle as defined in claim 3, wherein said spring means comprises coil springs on opposite sides of said mast and each connected between one of said mast flanges and the adjacent one of said flange members on the traction unit body.

5. In an industrial vehicle having a frame, a mast extending upwardly from said frame for supporting lift mechanism, laterally and longitudinally spaced wheels on said frame for supporting said frame and a load carried by the lift mechanism, a traction unit including a body independent of said frame and at least one drive wheel, a drive connection between said body and said frame providing for vertical movement only between said traction unit and the rest of the vehicle and preventing movement between said traction unit and the vehicle in other directions, and means connected between said traction unit and said frame independently of said drive connection to transfer a portion of the weight of said traction unit to said frame.

6. An industrial vehicle as defined in claim 5, wherein said mast comprises spaced beams having oppositely disposed flanges and said weight transferring means includes at least one spring connected between each of said mast beams and said traction unit.

References Cited

UNITED STATES PATENTS

| 2,520,857 | 8/1950 | Schreck | 187—9 |
| 2,959,235 | 11/1960 | Hubbard | 180—13 |
| 3,050,153 | 8/1962 | Molis | 180—13 |

HARVEY C. HORNSBY, Primary Examiner

U.S. Cl. X.R.

187—9